United States Patent Office 3,047,602
Patented July 31, 1962

3,047,602
BASIC ALUMINUM SALTS OF ACYLAMINO-ALIPHATIC MONO- AND POLYCARBOXYLIC ACIDS AND A PROCESS FOR PREPARING SAME
Remsen Ten Eyck Schenck, Bangor, Pa., assignor to Keystone Chemurgic Corporation, Bethlehem, Pa., a corporation of Pennsylvania
No Drawing. Filed Oct. 2, 1956, Ser. No. 613,388
10 Claims. (Cl. 260—448)

The common, stable valence state of the element aluminum is three. It can thus form, in addition to the normal salts, two series of basic salts with various acids. In one of these series two out of the three hydroxyl groups in $Al(OH)_3$ have combined with organic acid radicals. Examples of this class are ordinary basic aluminum acetate, $Al(OH)(CH_3COO)_2$, and basic aluminum tartrate, $Al(OH)C_4H_4O_6$. The second series is characterized by containing one atom of aluminum for each acid radical; thus, only one of the three hydroxyl groups in aluminum hydroxide has been neutralized in their preparation. Dihydroxy aluminum aminoacetate and dihydroxy aluminum sodium carbonate are examples of this class. I have discovered a process for making dihydroxy aluminum carboxylates of this general type, and have found the said carboxylates to have unique and valuable properties which make them useful in a variety of ways, as hereinafter set forth.

In accordance with the present invention, dihydroxy aluminum carboxylates, as already described, are produced by heating aluminum hydroxide, in the form of a dilute, freshly precipitated suspension, with the calculated quantity of the desired carboxylic acid, as illustrated in the following examples:

*Example 1.—Dihydroxy Aluminum Tartrate*

Two thousand forty parts by weight of a freshly precipitated aluminum hydroxide gel containing 5% by weight of aluminum oxide is mixed with a solution of 150 parts by weight of tartaric acid in an equal weight of water, and the whole is stirred until uniform. Under continued stirring, the mixture is heated. This process is often accompanied by the liberation of considerable carbon dioxide from the aluminum hydroxide, which generates a foam. As the boiling point is approached, the suspension becomes more opaquely white and thickens appreciably. It may be necessary to dilute somewhat in order to maintain adequate stirring. The reaction is completed by boiling for about 30 minutes. The finished slurry may be pumped through a spray drier, or it may be dewatered by centrifugation or vacuum filtration and the cake dehydrated in hot air driers and then ground. The product consists of about 270 parts by weight of a tasteless, chalk white, insoluble powder containing 20.0% by weight of aluminum. The final product is dihydroxy aluminum tartrate and corresponds to the formula $C_4H_4O_6Al_2(OH)_4$.

*Example 2.—Dihydroxy Aluminum Citrate*

Three thousand sixty parts by weight of a freshly precipitated aluminum hydroxide gel containing 5% by weight of aluminum oxide is mixed with a solution of 210 parts by weight of monohydrated citric acid in an equal weight of water, and the whole is stirred until uniform. Under continued stirring, the mixture is heated. This process is often accompanied by the liberation of considerable carbon dioxide from the aluminum hydroxide, which generates a foam. As the boiling point is approached, the suspension becomes more opaquely white and thickens appreciably. It may be necessary to dilute somewhat in order to maintain adequate stirring. The reaction is completed by boiling for about 30 minutes. The finished slurry may be pumped through a spray drier or it may be dewatered by centrifugation or vacuum filtration and the cake dehydrated in hot air driers and then ground. The product consists of about 372 parts by weight of a tasteless chalk white insoluble powder containing 21.8% of aluminum. The final product is dihydroxy aluminum citrate and corresponds to the formula $C_6H_5O_7Al_3(OH)_6$.

*Example 3.—Dihydroxy Aluminum Glycolate*

One thousand twenty parts by weight of a freshly precipitated aluminium hydroxide gel containing 5% by weight of aluminum oxide is mixed with 109 parts by weight of commercial 70% glycollic acid, and the whole is stirred until uniform. Under continued stirring, the mixture is heated. Some foaming may be encountered, as the temperature is raised, from carbon dioxide liberated by the aluminum hydroxide. As the boiling point is approached, the suspension becomes more transparent and its viscosity decreases. The reaction is completed by boiling for about 30 minutes. The finished slurry may be pumped through a spray drier, or it may be dewatered by centrifugation or vacuum filtration and the cake dehydrated in hot air driers and then ground. Dried filter press or centrifuge cake forms fragile, transparent, glassy masses which shatter at a touch. In the ground or spray-dried state, however, the product is a tasteless, insoluble, white powder amounting to 136 parts by weight and containing 29.9% of aluminum. The final product is dihydroxy aluminum glycollate and corresponds to the formula $C_2H_3O_3Al(OH)_2$.

*Example 4.—Dihydroxy Aluminum Aceturate*

Five hundred ten parts by weight of a freshly precipitated aluminum hydroxide gel containing 10% by weight of aluminum oxide is mixed with a concentrated solution of 117 parts by weight of aceturic acid (acetylglycine) in the minimum amount of hot water. The whole is stirred until uniform and heated to boiling. As the temperature is raised, the aluminum hydroxide slowly dissolves until, by the time the boiling point is reached, all solids are in solution. The mixture is boiled briefly, filtered if not perfectly clear, and either pumped through a spray drier or evaporated to dryness on a steam bath and the residue is then ground. The product is 177 parts by weight of a white powder, freely soluble in water to yield a faintly acid, astringent solution, and containing 15.3% of aluminum. The final product is dihydroxy aluminum aceturate and corresponds to the formula

$C_4H_6O_3NAl(OH)_2$

The dihydroxy aluminum carboxylates of the present invention are useful in a variety of ways. For instance, with the exception of the aceturate, the specific carboxylates referred to in the present specification as examples of the new compounds of the present invention are insoluble in water. When slurried with water these compounds have pronounced thixotropic properties, setting to a stiff gel when undisturbed and yet temporarily forming a mobile liquid under mechanical working. These compounds are also uniformly of high stability, both in the dry state or in suspension, and are compatible with both the liquid and solid phases of a wide variety of suspensions. These characteristics make these compounds highly useful in paints, printing inks and other suspensions where a mobile liquid is desired under mechanical working conditions.

The water soluble carboxylates of the present invention, as for instance the aceturate, are useful in the composition of deodorants of the anhidrotic type since they furnish solutions having the astringency of the aluminum ion but are much less acidic as a result of hydrolysis than the normal salts of aluminum. Likewise, the organic acid liberated by hydrolysis is markedly less destructive to fabrics than the mineral acids formed by such aluminum salts as the chloride or sulfate.

The dihydroxy aluminum carboxylates of the present invention are in equilibrium with hydrogen ion at a pH between 3 and 4. Like $Al(OH)_3$, they absorb three equivalents of hydrogen ion per atom of aluminum and this ratio is not affected by the fact that one hydroxyl group has been replaced by a carboxyl group. There is thus a buffering action provided by the hydroxyl groups when the weak carboxylic acid groups are replaced by strong acid. These characteristics coupled with the uniform stability of these compounds provide a versatility which other aluminum compounds do not possess.

While the present invention has been described by reference to certain specific examples, it will be understood that the process is equally applicable to the preparation of other dihydroxy aluminum carboxylates having from two to six carbon atoms. For example, other members of the hydroxy carboxylic acid series and homologous amino acids may be employed.

Having thus described my invention, I claim:

1. Stable basic salts of aluminum consisting of dihydroxy aluminum salts of aliphatic hydroxy- and acylamino- mono- and polycarboxylic acids having an even number of carbon atoms in the range of 2 to 6 inclusive, containing one atom of aluminum for each free carboxyl group of the corresponding carboxylic acid, each hydroxy carboxylic acid containing not more than one hydroxyl group per carboxyl group, and each acylamino carboxylic acid containing not more than one acylamino group per carboxyl group.

2. Dihydroxy aluminum tartrate.

3. Dihydroxy aluminum citrate.

4. Dihydroxy aluminum aceturate.

5. Dihydroxy aluminum glycolate.

6. In a process for preparing dihydroxy aluminum salts of aliphatic hydroxy- and acylamino- mono- and polycarboxylic acids having an even number of carbon atoms in the range of 2 to 6 inclusive, containing one atom of aluminum for each free carboxylic group of the corresponding carboxylic acid, the steps of heating freshly precipitated aluminum hydroxide with an aqueous solution of a carboxylic acid selected from the group consisting of aliphatic hydroxy carboxylic acids and aliphatic acylamino carboxylic acids, said hydroxy carboxylic acids containing not more than one hydroxyl group per carboxylic group, and said acylamino carboxylic acids containing not more than one acylamino group per carboxyl group while stirring, then boiling the reaction mixture.

7. In a process for preparing dihydroxy aluminum tartrate, the steps of heating freshly precipitated aluminum hydroxide with an aqueous solution of tartaric acid, stirring the mixture, and then boiling the mixture, thereby forming a slurry of dihydroxy aluminum tartrate having the formula $C_4H_4O_6Al_2(OH)_4$.

8. In a process for preparing dihydroxy aluminum citrate, the steps of heating freshly precipitated aluminum hydroxide with an aqueous solution of monohydrated citric acid, stirring the mixture, and then boiling the mixture, thereby forming a slurry of dihydroxy aluminum citrate having the formula $C_6H_5O_7Al_3(OH)_6$.

9. In a process for preparing dihydroxy aluminum glycolate, the steps of heating freshly precipitated aluminum hydroxide with an aqueous solution of glycolic acid, stirring the mixture, and then boiling the mixture, thereby forming a slurry of dihydroxy aluminum glycolate having the formula $C_2H_3O_3Al(OH)_2$.

10. In a process for preparing dihydroxy aluminum aceturate, the steps of heating freshly precipitated aluminum hydroxide with an aqueous solution of aceturic acid, stirring the mixture, and then boiling the mixture, thereby forming a solution of dihydroxy aluminum aceturate having the formula $C_4H_6O_3NAl(OH)_2$.

References Cited in the file of this patent

UNITED STATES PATENTS

| | | |
|---|---|---|
| 1,447,501 | Altwegg | Mar. 6, 1923 |
| 1,846,880 | Kussmaul | Feb. 23, 1932 |
| 2,011,292 | Koch | Aug. 13, 1935 |
| 2,139,134 | Roon | Dec. 6, 1938 |
| 2,327,815 | Niedercorn | Aug. 24, 1943 |
| 2,446,981 | Ninger | Aug. 10, 1948 |
| 2,588,090 | Delmar | Mar. 4, 1952 |
| 2,790,747 | Berger | Apr. 30, 1957 |

OTHER REFERENCES

King et al.: The Fundamentals of College Chemistry, second edition (1954), page 134.